United States Patent [19]

Kramer

[11] Patent Number: 4,852,956
[45] Date of Patent: Aug. 1, 1989

[54] HOLOGAN SCANNER SYSTEM

[75] Inventor: Charles J. Kramer, Pittsford, N.Y.

[73] Assignee: Holotek Ltd., Rochester, N.Y.

[21] Appl. No.: 147,041

[22] Filed: Nov. 23, 1987

Related U.S. Application Data

[63] Continuation-in-part of Ser. No. 941,880, Dec. 15, 1986, abandoned.

[51] Int. Cl.⁴ ............................................. G02B 26/10
[52] U.S. Cl. .................................................. 350/3.71
[58] Field of Search ....................................... 350/3.71

[56] References Cited

U.S. PATENT DOCUMENTS

| | | | |
|---|---|---|---|
| 4,239,326 | 12/1980 | Kramer | 350/3.71 |
| 4,289,371 | 9/1981 | Kramer | 350/3.71 |
| 4,325,601 | 4/1982 | Funato | 350/3.71 |
| 4,475,787 | 10/1984 | Starkweather | 350/6.4 |

FOREIGN PATENT DOCUMENTS 0144224  6/1985  European Pat. Off. ............ 350/3.71

OTHER PUBLICATIONS

Kramer, C. J., Laser Focus, Jun. 1981, p. 70.

Kramer, C. J., Proc. SPIE, 390, 165 (1983).

Primary Examiner—Bruce Y. Arnold
Attorney, Agent, or Firm—Martin LuKacher

[57] ABSTRACT

A hologon scanning system which generates an essentially bow-free scan line or lines across a surface using a planar, and preferably a holographic, grating disposed in a holding assembly which is rotated about an axis. The surface of the grating is at a constant angle of incidence with respect to a collimated beam of laser light propagating along the axis of rotation. The grating period for the wavelength of the laser beam and for the coordinate system associated with the rotating grating provides a diffraction angle from the grating which is constant with rotation angle; the diffracted beam being perpendicular to the rotation axis. An essentially bow-free, straight scan line is obtained across the receptor surface which may be a flat image plane or a cylindrical image plane having its axis along the axis of rotation of the grating. The beam scan angle across the receptor surface is equal to the angle of rotation of the grating, rather than being related to the angle of rotation by a factor approximately equal to the ratio of wavelength of the laser light to the grating period.

37 Claims, 11 Drawing Sheets

HOLOGAN SCANNER SYSTEM

This is a continuation of application Ser. No. 941,850 filed, Dec. 15, 1986 now abandoned.

DESCRIPTION

The present invention relates to laser scanner systems which provide an essentially bow-free scan line across a receptor surface. The invention more particularly relates to a scanner system using a hologon deflector (diffraction grating based deflector element) which is rotatable about an axis wherein the angle through which the laser beam scans in executing the scan line is equal to the angle through which the hologon deflector rotates.

The invention is especially suitable for use in laser printers wherein the accurate reproduction of various images, including alphanumeric, line graphic, and halftone images, depends upon the straightness and regularity (collinearity) of the scans in executing successive lines of the images and where equality of rotation angle and beam scan angle simplifies the modulation of the beam along the line, especially in the synchronization of the modulating signals with the movement of the beam.

Laser scanners must generate repetitive collinear, straight lines with high pixel to pixel uniformity and no loss of pixels to provide quality reproduction of images. To achieve the high pixel density required for high resolution applications, the scanner system must also be capable of flat-field imaging. For such imaging applications bow of the scan line must essentially be eliminated, and cross-scan errors due, for example, to wobble in the deflector, and facet-to-facet nonuniformities must be compensated.

Various scanning systems have been described for the purpose of eliminating bow and cross-scan errors. U.S. Pat. No. 4,475,787 issued Oct. 9, 1984 proposes a system for eliminating cross-scan errors in a rotating mirror scanner. This system is expensive to implement, since it requires mirror surfaces flat to an accuracy of about 1/16 of a wavelength of the laser light. Other approaches for eliminating bow and cross-scan errors in hologon scanners provided by multi-faceted holographic deflectors are described in the following articles authored by Charles J. Kramer: "Holographic Laser Scanners for Nonimpact Printing", *Laser Focus*, June 1981, p. 70; and "High Speed Read/Write Techniques for Advanced Printing and Data Handling", *Proceedings of SPIE*, 390, 165 (1983). U.S. Pat. No. 4,583,816 issued to Charles J. Kramer on Apr. 22, 1986 describes a system for providing an essentially bow-free scan. U.S. Pat. No. 4,239,326 issued Dec. 6, 1980 and U.S. Pat. No. 4,325,601 issued Apr. 20, 1982 described techniques to compensate for cross-scan errors in holographic disks and in conical deflectors having holographic facets of conical shape, which are expensive to implement since the holographic deflectors are not flat bodies and because optical elements (lenses and mirrors) are required which must be arranged precisely to effect the compensation of the errors.

Disk holographic deflectors with facets arranged on the surface of the disk have the additional drawback that the angle executed by the laser beam (the scan angle $\theta_s$) as it scans along the line on the receptor's surface, (referred to as the image plane regardless of its curvature) is not equal to the angle of rotation of the disk. The scan angle, $\theta_s$ is greater than the rotation angle $\theta_R$, by a factor equal to the wavelength-to-grating-period ratio, $\lambda/D$, for the case where the incidence angle is approximately equal to the diffraction angle, ($\theta_i = \theta_d$). This factor between scan angle and rotation angle (scan factor) is also usually not constant with rotation angle and, therefore, induces a source of distortion error into pixel placement. Where the diffraction angle is 45°, $\theta_s$ is approximately equal to 1.4142 $\theta_R$. Systems using a disk holographic deflector are disadvantageous in that synchronization of the signal which modulates the laser beam as it scans across the image plane during the electronic imaging, with the rotation of the deflector, is not possible without special timing circuitry, shaft encoders, or lens systems designed to account for this nonlinearity of scan factor with rotation angle.

It is the principal object of the present invention to provide an improved hologon scanner system utilizing a planar hologon defector element or elements which generates an essentially bow-free scan line, essentially free of cross-scan errors due to wobble of the deflector and centration errors, and where the deflector rotation angle and the scan angle of the deflected beam are equal to each other for all scan angles.

It is a further object of the present invention to provide an improved hologon scanner system which obtains an essentially bow and cross-scan error free, straight scan line, which may be implemented with low cost planar hologon elements in assembly with a rotatable holder, and which can be fabricated at low cost and is not sensitive to the position of the optical elements therein.

It is a still further object of the present invention to provide an improved hologon scanner system which generates essentially bow-free straight scan lines while allowing for very large scan angles, thereby reducing the focal length of optical devices (lenses or mirrors external to the deflector or due to focusing power in the holographic grating) needed to provided a desired scan length (the length of the scanning line at the receptor's surface).

It is a still further object of the present invention to provide an improved hologon scanner system wherein the spot size and shape (the cross-section of the laser beam at the receptor's surface) are not effected by rotation angle of the deflector or by deflector wobble.

It is a still further object of the present invention to provide an improved hologon scanner system wherein the incident laser beam maintains a constant relative angle with respect to the coordinate system associated with the rotating grating, such that a collimated incident beam parallel to the axis of rotation of the grating or collinear therewith, when the grating extends transversely through the axis of rotation, is diffracted by the grating to provide a diffracted beam perpendicular to the axis of rotation, thereby generating a bow-free straight scan line, and where the incident beam angle, $\theta_i$ is equal to the diffraction angle ($\theta_d$) so as to make the cross-scan angular position of the beam along the scan line insensitive to deflector wobble (e.g., beam displacement offsets associated with hologon wobble).

It is a still further object of the present invention to provide an improved hologon scanner system using a rotating grating which provides a holographic optical lens that focuses an input collimated beam to a point at the receptor's surface, the point describing an essentially bow-free and cross-scan error free scan line along the receptor's surface.

It is a still further object of the present invention to provide an improved hologon scanner system which enables a very large aperture incident beam to be used, by enabling the hologon deflector to be centered about the axis of rotation of the deflector so that almost its entire surface can be used to deflect the beam, thereby enhancing the resolution of the image generated using the system.

It is a still further object of the present invention to provide an improved hologon deflector system which may be implemented with a deflector of small diameter which may be rotated at very high speeds especially suitable for fast imaging applications as in high speed internal drum imaging systems.

It is a still further object of the present invention to provide an improved hologon deflector system which uses a hologon deflector having one or more planar facets, which may be fabricated on flat substrates, which are more easily fabricated than facets having curved (e.g., cylindrical or conical) surfaces, and which, unlike facets which are curved, provide equal incidence and diffraction angles for reduced cross-scan error sensitivity to deflector wobble, and which may be adjusted to compensate for facet differences (such as facet intensity throughput, facet substrate wedge and facet grating periodicity) after fabrication.

It is a still further object of the present invention to provide an improved hologon scanner having a plurality of individual grating facets adjustably disposed within a rotatable holder and which allows adjustment thereof, as by tilting the facets, to compensate for facet to facet cross-scan error caused by small differences in grating period, substrate wedge or fixed tilts of the shaft from the motor which is connected in driving relationship with the hologon scanner.

Briefly described, a hologon scanner system in accordance with the invention, utilizes at least one planar light transmissive member having a holographic diffraction grating formed thereon. The grating is preferably a holographic grating. The grating is rotatable about an axis, and preferably is part of an assembly with a holder which is rotated about the axis by a motor. The grating is inclined at a predetermined angle to the axis so that a beam of laser light propagating in the direction along the axis, preferably collimated light collinear or parallel to the axis, is diffracted by the grating to produce a diffracted beam transverse and maybe perpendicular to the axis which scans a bow-free line across an image surface over a scan angle, $\theta_s$ which is equal to $\theta_R$, the angle of rotation of the grating. The predetermined angle at which the grating is inclined is such that the angle between the direction of the beam propagating along the axis and the normal to the grating, if any, the angle of incidence of the beam to the grating, $\theta_i$, and the diffraction angle, $\theta_d$, of the diffracted beam exiting the grating add to the predetermined angle which may be 90°, and $\sin\theta_i + \sin\theta_d$ is equal to the ratio of the wavelength of the light to the grating period ($\lambda/D$).

A multiplicity of planar gratings (hologon facets) may be disposed in the holder, spaced radially from the axis and circumferentially spaced from each other about the axis. A single grating may be used which is disposed transverse to the axis, and preferably with the axis passing through the center thereof. For the multi-faceted hologon deflector, the facets define a pyramidal hologon scanner when four facets are used.

The grating may have power so as to focus the beam to a point at the receptor surface (the image plane). The image plane may be planar when flat-field imaging is desired. Alternatively, the image plane may be cylindrical, and the scanner disposed at the center of the cylinder or drum having the receptor surface on the inside thereof. The scanner may be advanced along the axis to scan successive collinear scan lines on the cylindrical receptor surface.

A prism may be used through which the incident collimated light passes to the grating so as to enable the grating to be provided with incidence and diffraction angles of less than 45° (e.g., a 30° deflection in the prism and 30°, equal incidence and deflection angles). The diffracted beam exits perpendicularly to the axis of rotation of the grating and bow-free, cross-scan error insensitive scanning results.

The incident beam in the single-facet, plural-facet or facet having focusing power cases maintains a constant relative angle with respect to the coordinate system associated with the rotating grating(s), thereby providing an essentially bow-free, straight scan line which, because of the equal incidence and diffraction angles, is insensitive to cross-scan errors associated with wobble of the grating as it rotates.

The foregoing and other objects, features and advantages of the invention as well as presently preferred embodiments thereof, and the best modes of practicing the invention now known, will become more apparent from a reading of the following description in connection with the accompanying drawings in which.

Figure 1:
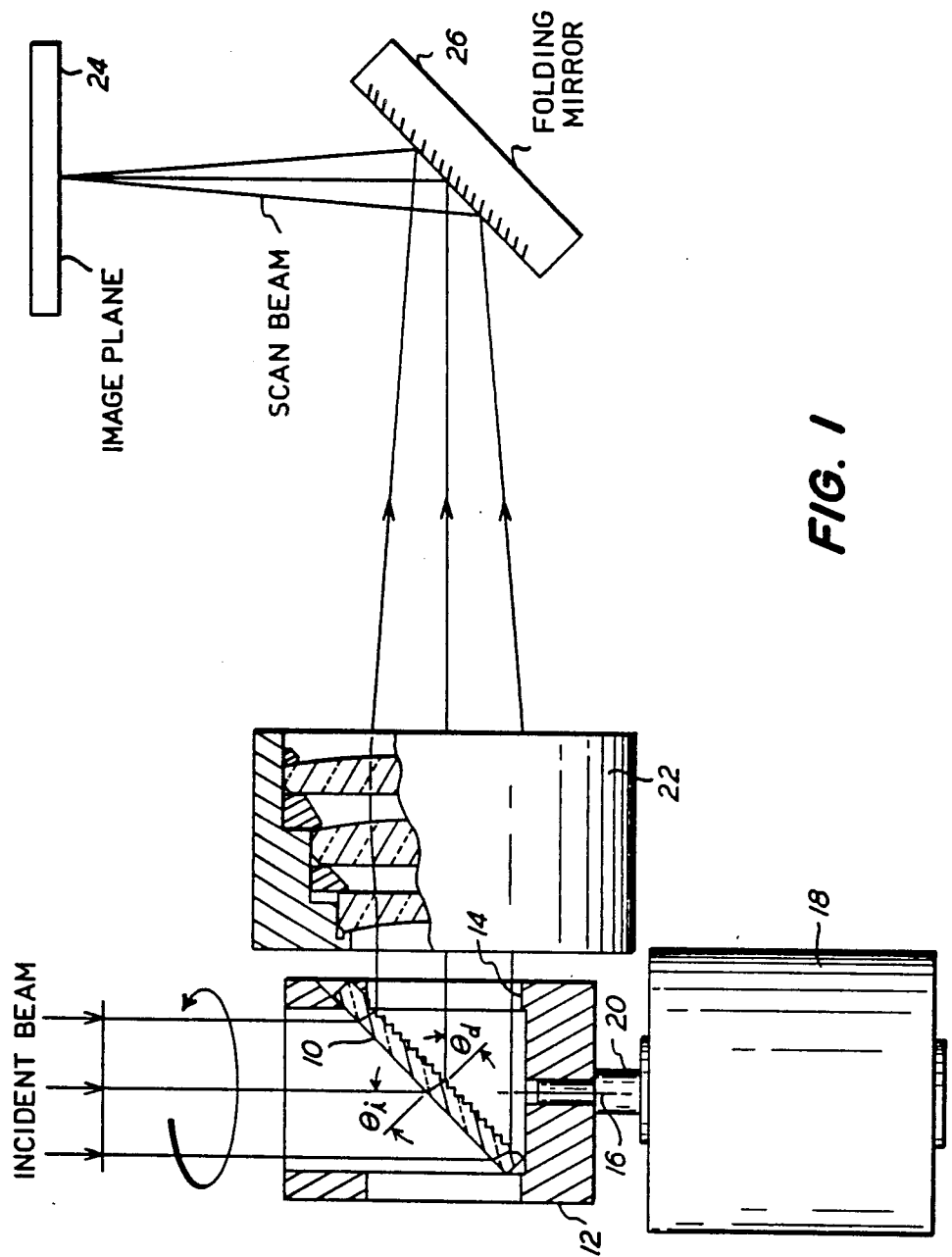
FIG. 1 is a diagrammatic elevational view, partially in section, illustrating a hologon scanner system in accordance with an embodiment of the invention.

Referring to FIG. 1, a collimated beam of laser light is incident on a planar grating beam deflector 10. This beam deflector is a hologon having a single facet. The grating can either be holographically formed, replicated onto, or mechanically ruled on one side of a substrate. The term "hologon" contemplates and includes all such gratings. The grating 10 is mounted in a holder 12 having an exit hole or aperture 14. The holder is preferably cylindrical in shape, but may be a body with rectilinear sides. The holder 12 and the grating 10 are rotated about an axis 16 which extends centrally through the grating 10. The incident beam propagates in the direction of the axis, and preferably is collinear with the axis. The grating 10 may be rectilinear in shape (square, rectangular or multi-sided). The grating surface is flat and planar. The grating fits into slots in the holder which orient the grating at a predetermined angle with respect to the axis of rotation. The angle of the incident beam, $\theta_i$, with regard to the grating substrate normal, and the angle of the diffracted beam, $\theta_d$, with regard to the grating substrate normal, are preferably equal. $\theta_i$ is shown at the surface of the substrate opposite to that on which the grating is formed while $\theta_d$ is shown on the side of the substrate on which the grating is formed. There is a slight angle of refraction within the substrate which for practical purposes does not affect the $\theta_i = \theta_d$ condition.

The assembly of the grating holder 12 and the grating 10 is rotated about the axis of rotation 16 by a motor 18, the shaft 20 of which is connected to the holder 12. Mounting bases for the motor are not shown to simplify the illustration.

The scanner system shown in FIG. 1 is of a preobjective configuration and has a focusing lens 22 having its optical axis perpendicular to the axis of rotation 16. The lens focuses the diffracted beam exiting the grating holder upon a receptor surface 24 which provides the image plane. A folding mirror 26 may be used between the lens and the image plane 24 to reduce the length of the scanner system. The focusing lens is a multi-element lens which focuses the diffracted beam to a spot on the image plane. The spot is scanned along the scan line once during each rotation of the grating 10. The grating holder and assembly may be of small diameter and light in weight so as to be capable of rotation at high speed. The configuration of the holder, especially when cylindrically shaped, minimizes windage losses.

The hologon scanner system, including the planar grating, generates a bow-free scan line having a cross-scan angular position which is essentially insensitive with respect to deflector wobble and centration errors as will be explained more fully below. In the example illustrated in FIG. 1, the grating surface where diffraction occurs is at 45° to the axis of rotation 16 of the holder 12, which is collinear with the axis of the motor shaft 20. Under these conditions, an incident collimated beam of light propagating along the axis of rotation is also collinear with the axis of rotation 16 and, therefore, has a constant angle of incidence with respect to the normal to the grating surface. For this scanner geometry, the incident beam also maintains a constant relative angle with respect to the coordinate system associated with the rotating grating 10 and, therefore, the diffraction angle $\theta_d$ from the grating 10 is constant with rotation angle, $\theta_R$. A bow-free, straight scan line is obtained across the image plan 24 for this geometry when the diffracted beam is perpendicular to the rotation axis 16.

As explained in the above referenced article in the Proceedings of the SPIE, the advantage of having the incident angle to the grating surface be equal to the angle of diffraction ($\theta_i = \theta_d$) is that the diffracted beam cross-scan angular position is self-compensated with regard to deflector wobble, thereby reducing cross-scan error.

If $d\phi$ is the change of deflector orientation due to wobble, then the change in diffraction angle $d\theta_d$, with respect to the fixed image plane coordinates is $$d\,\theta_d = \left[ 1 - \frac{\cos(\theta_i + \phi)}{\cos(\theta_d - \phi)} \right] d\phi \quad (1)$$

For $\theta_i = \theta_d$ and small values $\phi$, Equation (1) reduces to zero.

For the scanner geometry illustrated in FIG. 1, the incident beam angle $\theta_i$, with respect to the normal surface of the grating 10 is 45° and the diffraction angle $\theta_d$, with respect to this grating normal is also 45°. A bow-free scan line whose cross-scan angular position is very insensitive to deflector wobble is achieved for the geometry illustrated in FIG. 1 as a result of having the diffracted beam exit the deflector perpendicular to the deflector rotation axis ($\theta_i + \theta_d = 90°$) and by having $\theta_i = \theta_d$. A bow-free scan line can be achieved for the case where $\theta_i$ does not equal $\theta_d$. For example, if the grating 10 in FIG. 1 is orientated such that $\theta_i = 30°$, $\theta_d = 60°$ and the diffracted beam is perpendicular to the rotation axis 16, $\theta_i + \theta_d = 90°$ and the scan line is bow-free. For this case, the cross-scan positional error of the scan line is hundreds of times more sensitive to deflector wobble than the case where $\theta_i = \theta_d$.

In a practical configuration of the type illustrated in FIG. 1 where the grating assembly of the grating 10 and holder 12 is hard mounted to the shaft 20 of the motor, a fixed tilt angle of the axis of rotation 16 at the grating with respect to the shaft axis 20 of about one to ten minutes of arc is usually unavoidable due to manufacturing tolerances. Even six minutes of fixed tilt angle would be reduced to 1.25 seconds of fixed scan beam tilt angle at the image plane for the case where $\theta_i = \theta_d$. An advantage of the scanner system is that this fixed tilt angle does not cause relative changes in the cross-scan position between scans for the single facet deflector grating 10, since the tilt angle is the same for each scan line. Substrate wedge of the grating 10 does not introduce cross-scan error because it produces the same tilt error per scan.

Relative changes in the fixed deflector tilt angle (random wobble) due to motor bearing inaccuracies and/or vibrations is the cause of cross-scan error. Such errors are essentially eliminated because of the use of equal incidence and diffraction angles. For example consider an exemplary case where the motor bearing inaccuracies and/or vibrations cause a maximum wobble error between the motor shaft axis and the axis of rotation 16 of about 5 seconds of arc. In accordance with equation (1) the resulting cross-scan error for a grating having $\theta_i$ equal $\theta_d$ equals 45° is $2.42 \times 10^{-4}$ seconds. This amount of offset in the diffracted beam is so small as not to be measurable with conventionally optical instruments.

The straightness of the scan line is a function of how perpendicular the scan beam is with respect to the deflector rotation axis 16. If the scan beam makes and angle $\theta_x$, with respect to the plane that is perpendicular to the deflector rotating axis, the scan line departs from a straight line trajectory by the value $\Delta Y$, which is given by $$\Delta Y = (\sqrt{Z^2 + X^2} - Z) \tan \theta_x \qquad (2)$$

where X is the displacement of the scan line from the center of the image plane, Z is the focal length of the focusing lens 22 (or the distance from the surface 10 of the grating where the diffraction occurs to the center of the image plane when there is no lens following the grating 10.) By way of example, for the case where $Z = 530$ mm, $X = 165$ mm and $\theta_x$ is 0.1°; $Y = 0.043$ mm.

It is evident from this example that a bowed scan line results from very small deviations of the scan beam from being perpendicular to the deflector rotation axis. The scan beam angle with respect to the rotation axis 16 is determined by the angle the grating facet 10 makes with the axis 16, the angle, $\theta_i$, the wavelength, $\lambda$, of the incident light on the grating facet 10, and the grating period D. In terms of the grating facet normal, the relationship between $\theta_i$ and $\theta_d$ is given by the grating equation:

$$\sin \theta_i + \sin \theta_d = \lambda/D \qquad (3)$$

For the geometry illustrated in FIG. 1, $\theta_i = \theta_d = 45°$ and $\lambda/D = 1.4142$. If the grating facet is at 45° to the rotation axis 16, the scanned beam is exactly perpendicular to the rotation axis and a bow-free scan line results. If the grating facet deviates by a small angle from being at 45° to the incident beam, equation (1) states that the scan beam will be essentially perpendicular to the rotation axis 16, and the scan line will be essentially bow-free. If on the other hand, the grating facet is at 45° to the rotation axis 16, and $\theta_i$ is slightly deviated from being at 45° to the grating normal, $\theta_d$ will be deviated by the same amount and may introduce measureable bow into the scan line.

Figure 4:
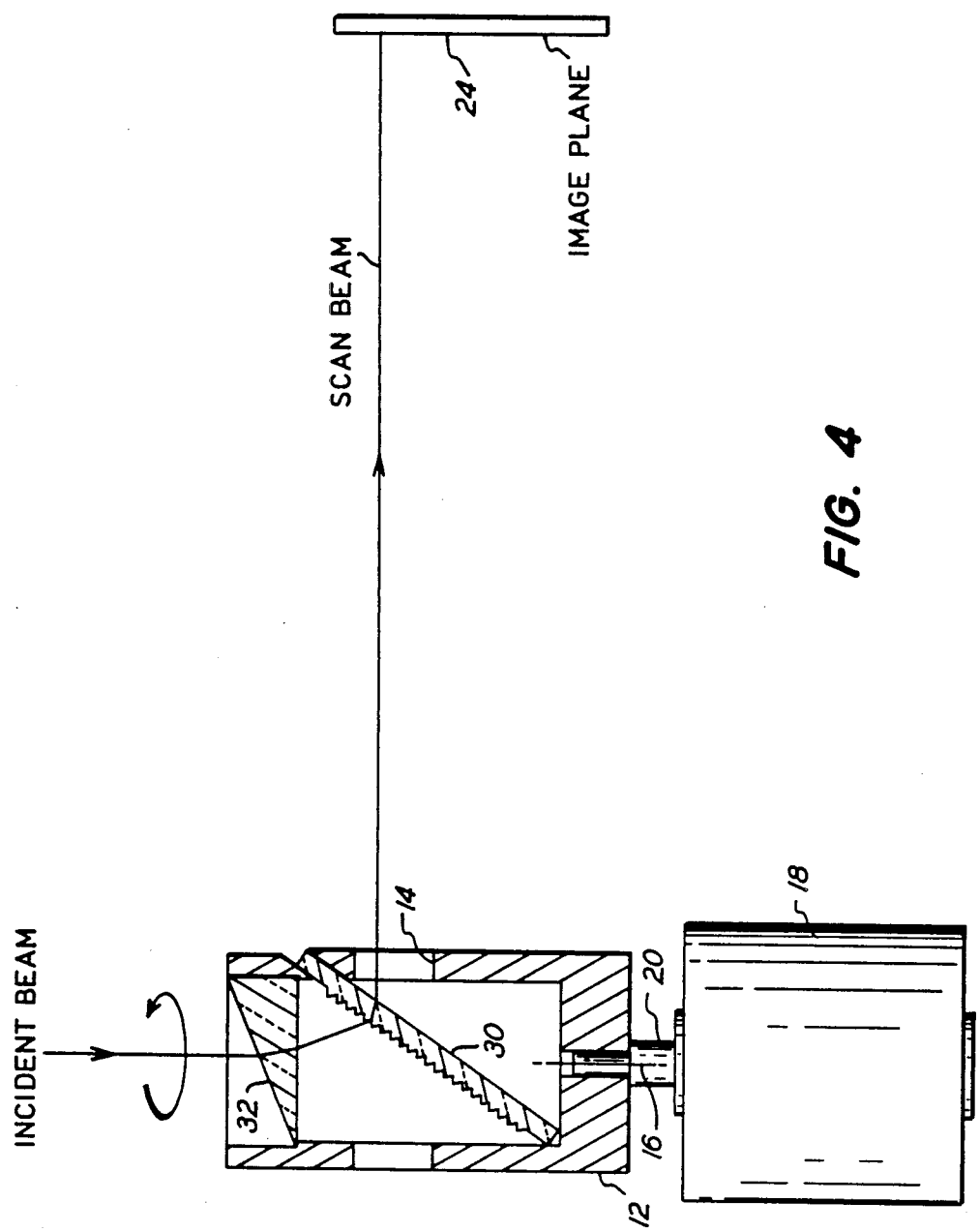
FIG. 4 is a view similar to FIG. 1 of a hologon scanner system utilizing a prism for predeflection of the incident collimated beam.

The requirement for a bow-free scan line is that the incident beam be parallel to the deflector rotation axis 16 and that the deflected beam be perpendicular to the rotation axis 16. This condition can be achieved even if $\theta_i$ is equal to $\theta_d$ and both of these angles are equal to an angle other than 45°. For example, a bow-free scan is achieved for $\theta_i = \theta_d = 30°$ when the incident light beam is deflected at another angle to the axis of rotation so that the three angles, namely, the angle of deflection, $\theta_i$ and $\theta_d$ add to 90°. A scanner system having such an arrangement is illustrated in FIG. 4 and will be discussed in greater detail hereinafter.

For some cases it may not be desirable to have $\theta_i$ equal $\theta_d$, to avoid retroreflected light from the grating propagate back along the incident beam path to the laser source which may give rise to ghost beams or laser instability. This problem can be alleviated by tilting the incident beam slightly with respect to the grating rotation axis 16 and changing $\lambda/D$ slightly. If $\lambda/D$ equals 1.413, the incident beam can be tilted 0.1° with respect to the axis 16, or make an angle of 44.9° with respect to the normal grating surface. The scan beam for this case makes an angle of 90.0018° with respect to the spinner axis. There is a slight bow of the scan line, which is immaterial for most printing and other image reproduction applications.

A significant advantage of the scanner system configuration illustrated in FIG. 1 over conventional hologon deflector systems using facets mounted on a disk with the diffraction surfaces of the facets in a plane perpendicular to the axis of rotation of the disk is in the relationship of the beam scan angle $\theta_s$ to the rotation angle $\theta_R$. For a disk hologon having an incidence angle $\theta_i$ equal to the diffracted angle $\theta_d$, the relationship between $\lambda/D$, the rotation angle $\theta_R$ and the beam scan angle $\theta_s$ is $$\theta_s = \lambda/D \theta_R. \qquad (4)$$

For example, if $\theta_i = \theta_d = 45°$, $\lambda/D = 1.4142$ and the beam scan angle $\theta_s$ in a disc hologon is 1.4142 times the rotation angle $\theta_R$.

For the arrangement shown in FIG. 1, as well as in every other embodiment of the invention, the scan angle of the deflected beam is always equal to the scanner rotation angle and is not a function of the $\lambda/D$ ratio of the grating deflector. The equality of scan angle and rotation angle simplifies both the optical design of the scan lens and the electronic system for modulating the laser beam in order to print and otherwise record information on the receptor surface at the image plane.

The rotation symmetry of the scanner system shown in FIG. 1 permits large scan angles to be used because the scan line is essentially bow-free and the scanning beam profile is constant with deflector grating rotation angle and does not become elliptically shaped, as is the case with disc hologon scanners.

The focusing lens is preferably a flat field $f - \theta$ lens so that the scanning spot has constant size and velocity across the entire scan field. Only the tangent function need be considered in the design of the lens 22 because the scan angle $\theta_s$ is equal to the rotation angle $\theta_R$ of the deflector. This is another feature of the invention, which reduces the cost of implementation of the scanner system. Preferably, the lens 22 is a flat field $f - \theta$ lens having a large scan angle in the range of ±25° to ±30°. Also, because collimated light is incident upon the lens 22, the position of the spot focused on the image plane is only affected by angular changes in the diffracted beam and is insensitive to beam displacement offsets.

Another advantage of the scanner geometry shown in FIG. 1 is that the grating deflector 10 is centered about the rotation axis 16 and, therefore, its entire surface can be used simultaneously to deflect the incident beam without truncating the beam. This deflector geometry permits very large incident beam apertures to be used in comparison to the diameter of the deflector housing 12, and therefore, is very suitable for high resolution imaging applications. The centered grating deflector geometry also insures that changes in facet diffraction efficiency are only a function of the relative changes in the incident beam polarization state associated with deflector rotation. There is no relative change in polarization state when a randomly or circularly polarized incident laser beam is used. Changes in facet diffraction efficiency are usually proportional to the cosine squared of the deflector rotation angle when a linearly polarized laser incident beam is used.

A disadvantage of the single facet deflector geometry of FIG. 1 is that the duty cycle of the scanner system is low, if the image plane 24 is a flat surface. The duty cycle of the scanner system can be very high for the single facet deflector if the image plane has the form of a cylindrical surface having an axis of symmetry collinear with the deflector axis of rotation 16. Under these conditions, almost the entire 360° rotation angle of the deflector can then be used in scanning each line. The collinearity of the cylindrical surface axis with the deflector rotation axis insures that each scan line is straight even if the deflected beam is not perpendicular to deflector rotation axis.

Figure 2:
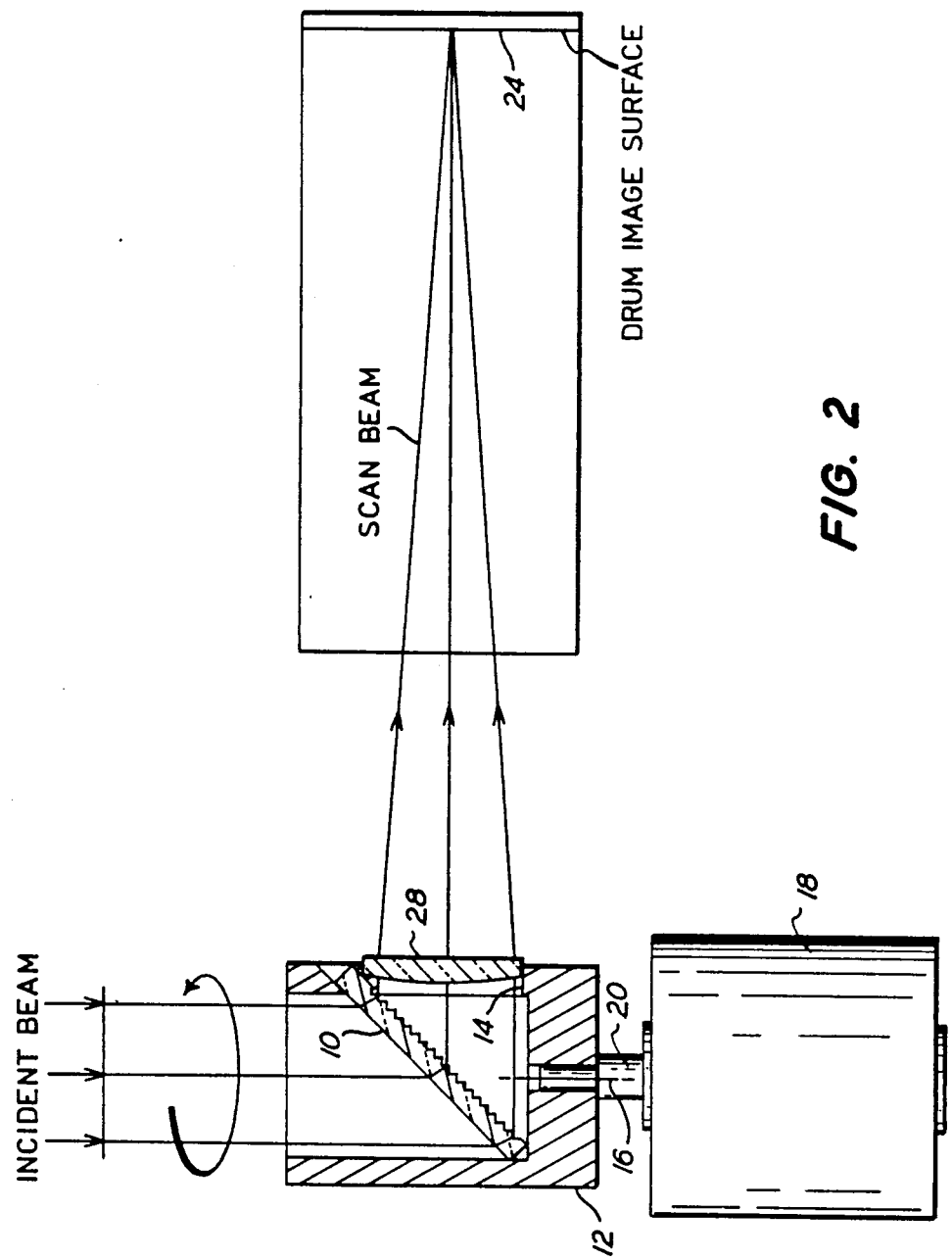
FIG. 2 is a view similar to FIG. 1 of a hologon scanner system in accordance with another embodiment of the invention.

Referring to FIG. 2 there is shown a scanner system similar to FIG. 1. Like parts are designated by like reference numerals. In FIG. 2, the image plane 24 is provided by a cylindrical surface on the inside of a drum which is open for the passage of the scan beam (the diffracted beam). The axis of symmetry of the drum in FIG. 2 is collinear with the deflector rotation axis 16. A focusing lens 28 is mounted in the opening through which the diffracted beam passes. The lens 28 is part of the assembly with the grating 10 and holder 12. The holder 12 may also by cylindrical. The lens rotates with the assembly. The lens 28 is illustrated as a single element plano-convex lens. A cemented or air-spaced doublet lens or a multiple element lens, as is the case for the lens 22 (FIG. 1) may also be used. By using an image surface which is cylindrical (e.g., the inside of a sector of a drum) and which has its axis collinear with the axis of rotation 16, the scanning image spot has a constant size and velocity along the entire image surface. The scan angle can be 360°, if desired, thereby providing a very high duty cycle for the system.

The angular direction of the rays leaving the lens 28 is essentially insensitive to wobble of the holder 12, since the principal planes of the lens are located near the center of the lens. If the holder 12 wobbles about a point displaced from the lens center, the beam exiting the lens has the same ray direction even though it is displaced. For example, if the holder is tilted by 5 seconds of arc about its center (the axis of rotation 16), which is located for example one centimeter from the lens, the beam exiting the lens is displaced only by 0.24 micrometers. This displacement is so small that the scanning system illustrated in FIG. 2 is, for all practical purposes, insensitive to deflector wobble.

Figure 2A:
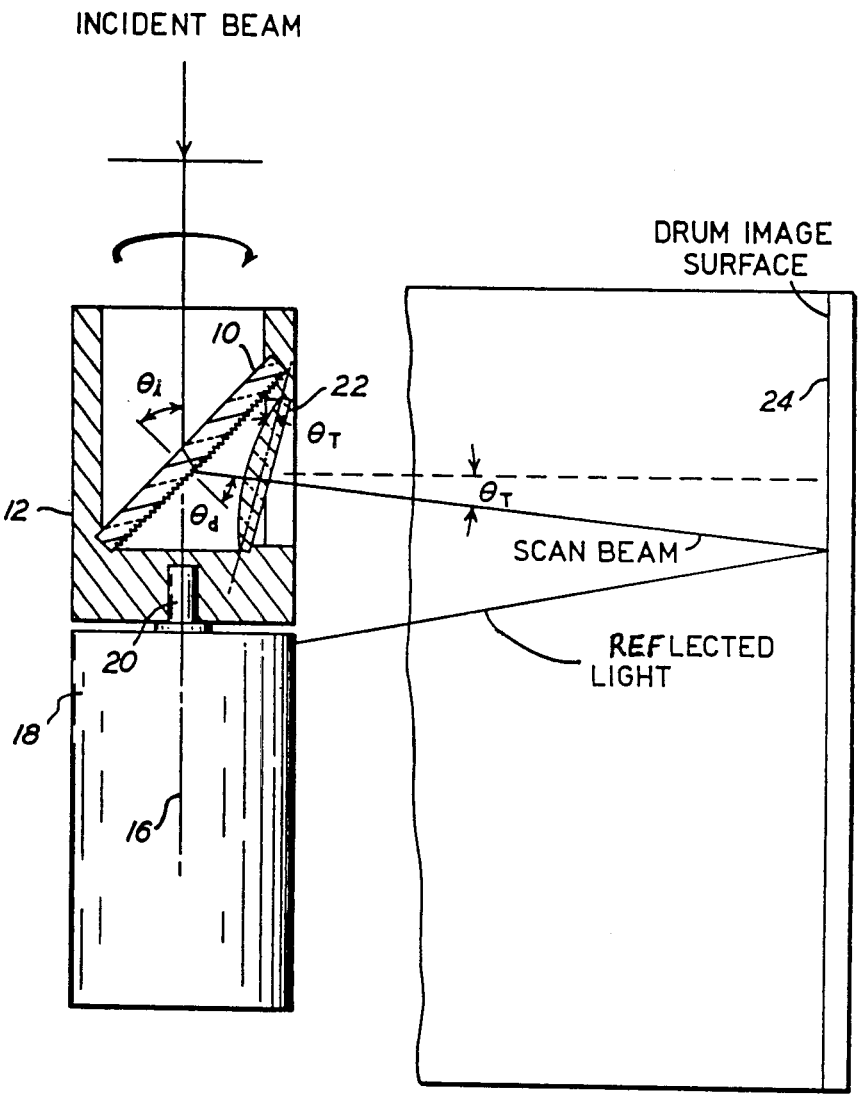
FIG. 2A is a view similar to FIG. 1 of Hologon Scanner System wherein the grating and lens are tilted so that reflected light from the image surface is diverted from the path of the light which is incident upon the grating.

Referring to FIG. 2A there is shown a scanner system similar to that shown in FIGS. 1 and 2, and like parts are indicated by like reference numerals. This figure illustrates the case where the grating 10 is tilted to avoid reflected light from the image surface of the drum 24 (which drum is a cylindrical surface collinear with the rotation axis 16) from propagating back along the incident beam path to the laser source as discussed above. Also as discussed above, the collinearity of the cylindrical surface axis with the deflector (grating 10) rotation axis 16 ensures that each scan line is straight, even if the deflected beam is not perpendicular (is tilted at the angle $\theta_T$) and is not perpendicular to the deflector rotation axis 16. The angle of incidence $\theta_i$ is equal to the angle of diffraction $\theta_d$. However, the grating is tilted so that the diffracted scan beam deviates from the perpendicular to the axis 16 by $\theta_T$. For example, $\theta_i$ and $\theta_d$ may be 42.5° and $\theta_T$ may be 5°.

The principal axis of the postobjective lens is, as conventional, along the scan beam when it is set at the center of scan. Accordingly, the plane of the lens is tilted to the axis of rotation, also by the tilt angle $\theta_T$. The scan beam then, upon reflection, is reflected by an angle of 10° to the scan beam. The reflected light then strikes in the vicinity of the motor 18 and does not pass through the lens 22 or the grating.

In some cases where the circularly polarized light is depolarized by the grating (made linearly polarized), the tilted configuration avoids the passage of a portion of the reflected light back along the incident beam path into the laser and thereby avoids interference with the operation of the laser.

Figure 3:
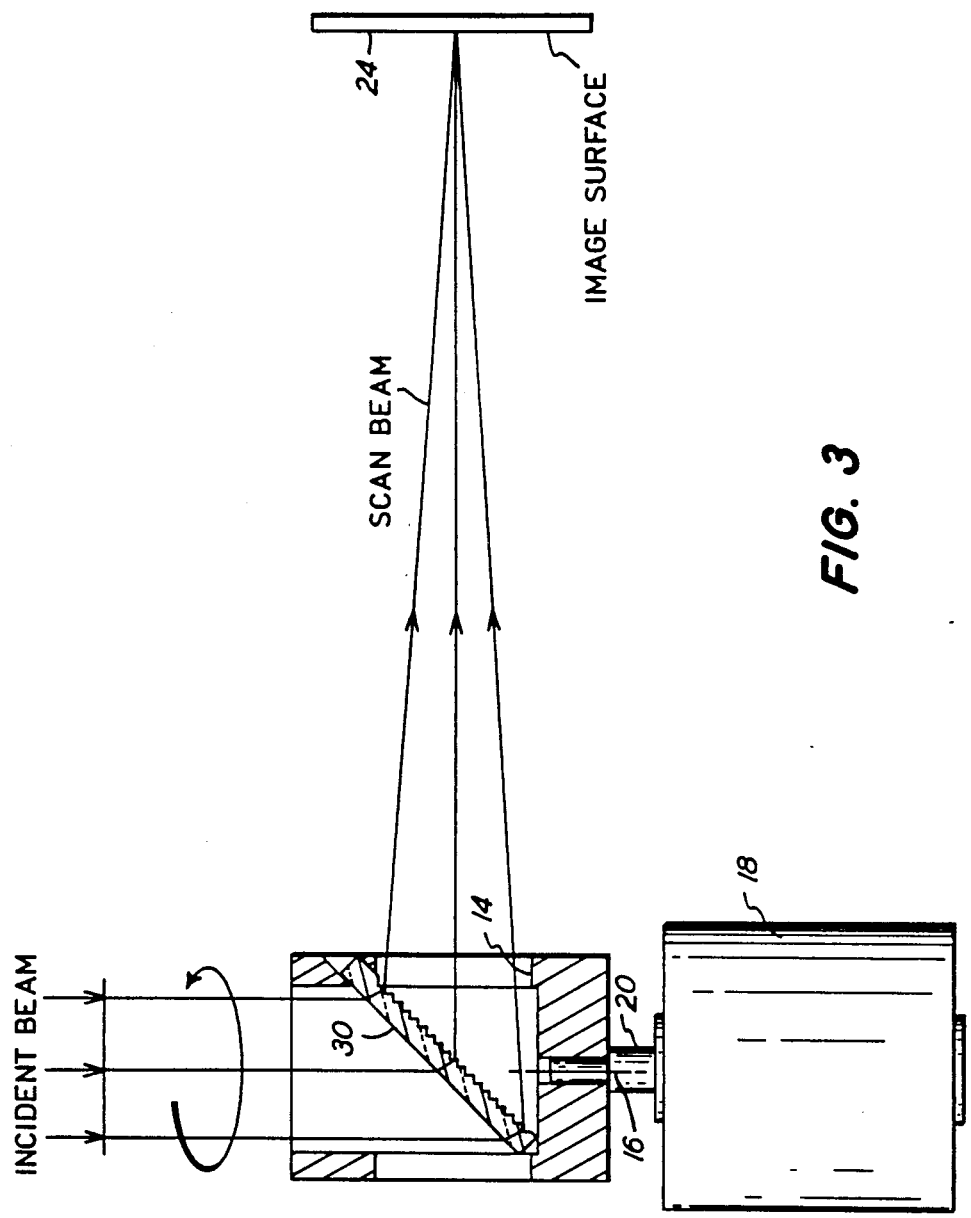
FIG. 3 is a view similar to FIG. 1 of a hologon scanner system which utilizes a holographic lens beam deflector grating, in accordance with another embodiment of the invention.

Referring to FIG. 3 there is shown a scanner system similar to that shown in FIGS. 1 and 2, and like parts are indicated by like reference numerals. The holographic grating 30 used in the system shown in FIG. 3 is constructed in the form of a holographic optical lens with power. For this case, the grating deflector 30 both diffracts and focuses the input collimated beam to a point at the image plane on the image surface 24. In the system shown in FIG. 3 the incident beam maintains a constant relative angle with respect to the coordinate system associated with the rotating grating 30 and therefore, the imaging properties of the holographic lens remain constant as the grating 30 is rotated about the axis 16. As a result of the constant angular relationship which the collimated incident beam maintains with respect to the grating deflector 30, the scanning spot has a constant size and velocity along entire image surface 24 if this surface is a cylinder having its axis of symmetric collinear with the deflector rotation axis 16.

Referring to FIG. 4, there is shown still another embodiment of the invention, wherein parts similar to those shown in the preceding figures are illustrated by like reference numerals. In the system shown in FIG. 4, a prism element 32 is used in the path of the incident beam to reduce the angle through which the grating must diffract (bend) the incident light. Instead of a prism, a second grating could be used to divide down the total angle of diffraction. The grating, shown by way of example in FIG. 4 has equal angles of incidence and diffraction, $\theta_i = \theta_d = 30°$. This provides a total diffraction angle of 60°. The prism 32 bends the incident beam through an angle of 30°. The combined angle to which the prism and grating bend the light is 90°, which is the same angle through which the incident light is bent in the system shown in FIGS. 1, 2, and 3.

By reducing the angle by which the grating diffracts the light, the fabrication of the grating is simplified. This is a significant feature especially for scanner systems which operate with light having shorter wavelengths, such as in the deep blue and ultraviolet portion of the spectrum.

The grating 30 shown in the system of FIG. 4 is illustrated as a grating having a focusing power. A grating such as the grating 10 without focusing power may be used. Then a lens, either a fixed external lens such as the lens 22 or a lens such as the lens 28 which is mounted in the opening 14 and rotates with the grating 30, may be used.

If it is desired, instead of using an incident collimated beam (which provides an incident collimated wave front) as is illustrated in the system shown in FIGS. 1 through 4 as well as in other embodiments of the invention described hereinafter, a diverging or converging, spherical wave front from a point source of laser light that is centered on the rotation axis 16 may be used. If a diverging wave front is used (in FIG. 3), that originates from a point on the rotation axis 16, and that is at the same distance along the rotation axis 16 as the center of the scan line on the image plane is from the diffraction surface, each of the incident and diffracted rays have equal angles of incidence and diffraction, $\theta_i = \theta_d$; therefore making the size and shape of the spot at the image plane essentially insensitive to wobble of the grating element.

In the system shown in FIGS. 1-3, the grating surface faces the opening 14 in the holder 12 through which the deflected beam passes. Alternatively the grating may be formed on a substrate which is air-spaced from a protector plate. Such gratings are used in the systems illustrated in FIG. 5 and in FIGS. 6-9. In FIG. 2, the grating surface faces toward the lens 28 for protection and in FIG. 4 the grating surface faces the prism 32 for protection.

Figure 5:
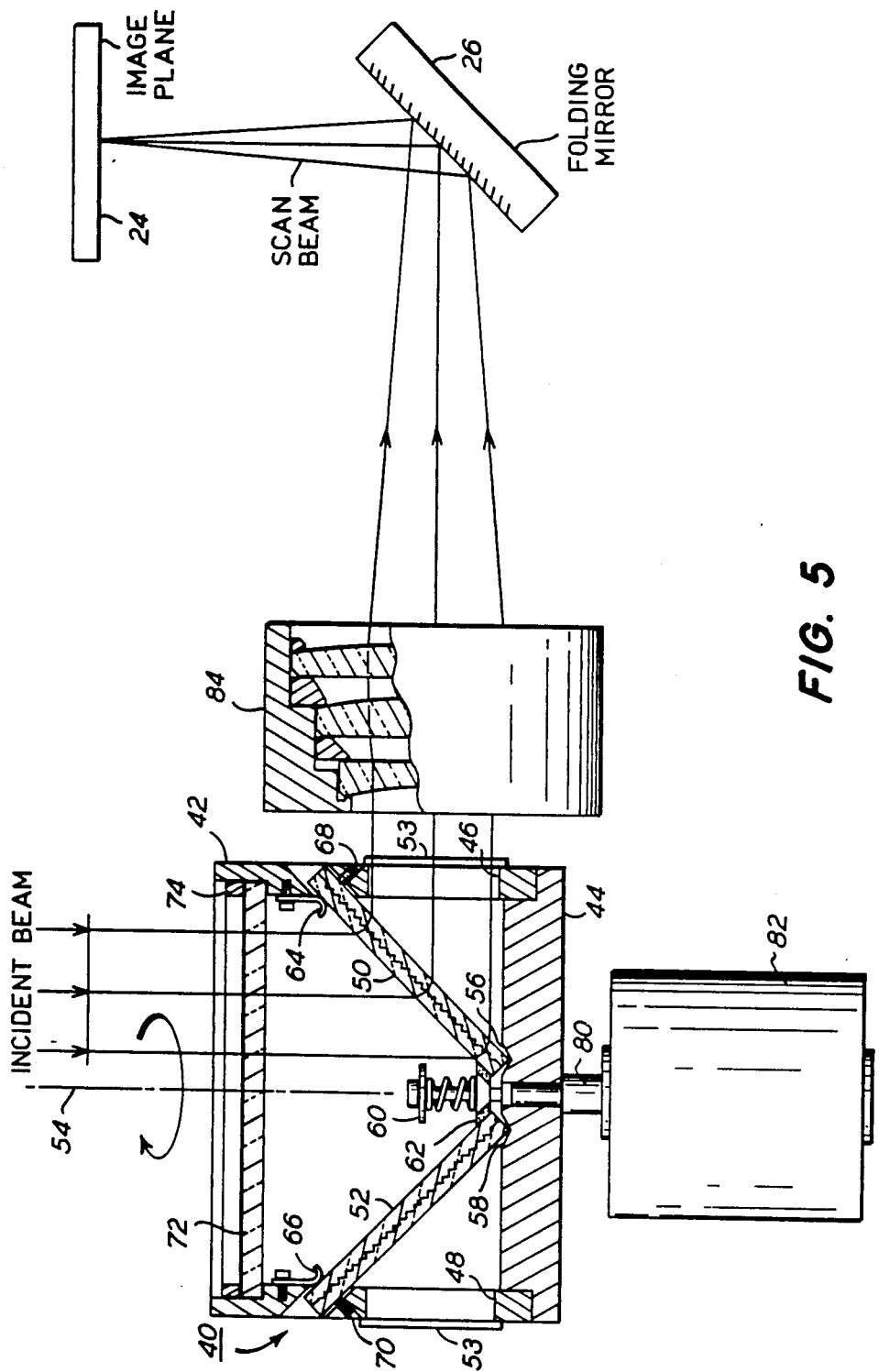
FIG. 5 is a diagrammatic elevational view, similar to FIG. 1 of a hologon scanning system in a preobjective hologon scanner arrangement and utilizing a pair of planar grating beam deflectors, in accordance with another embodiment of the invention.
Figure 6:
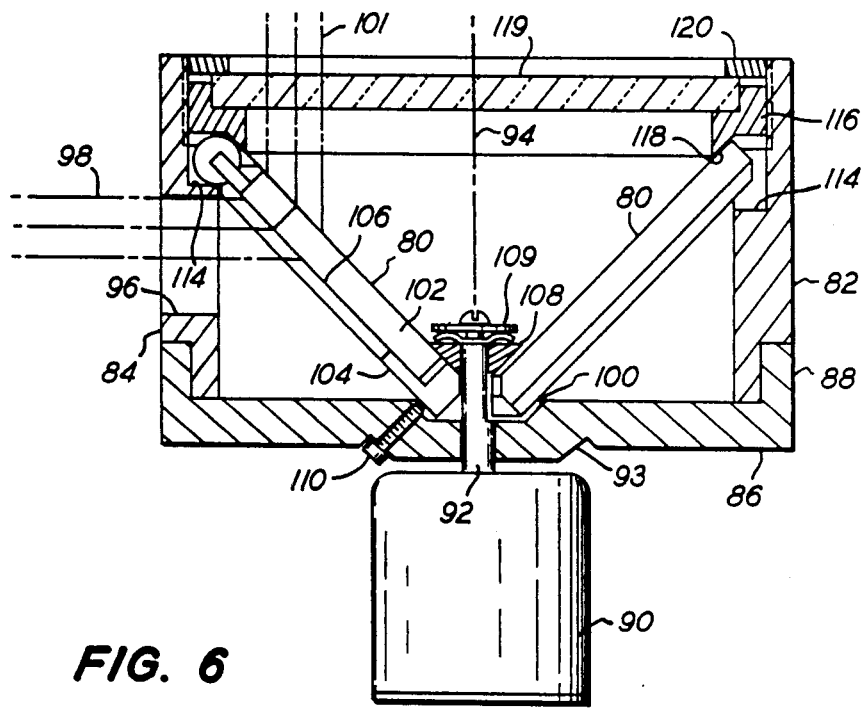
FIG. 6 is an elevational view, the view being taken along the line 6—6 in FIG. 7, of a multifacet hologon scanner assembly in accordance with another embodiment of the invention.
Figure 7:
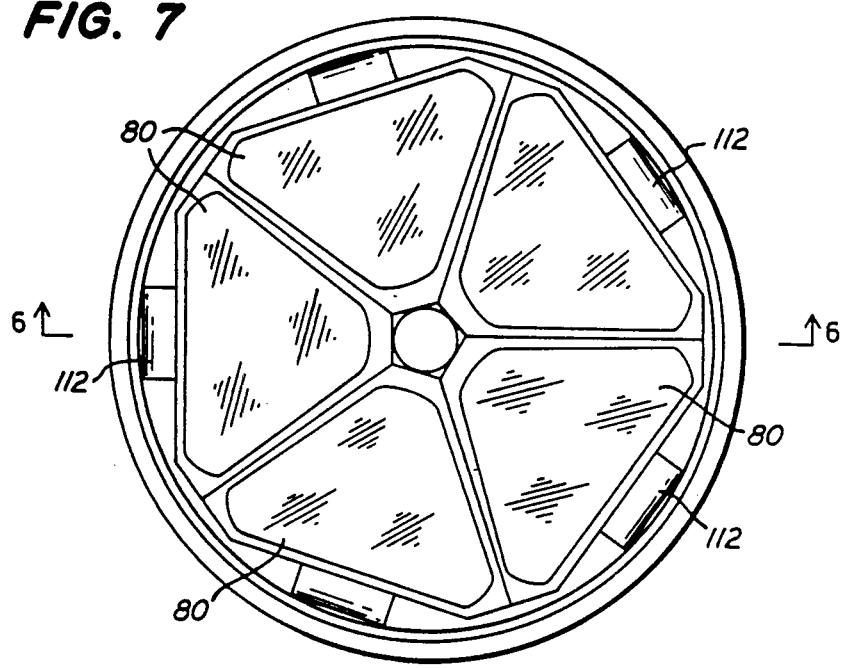
FIG. 7 is a plan view of the assembly shown in FIG. 6 with the upper clamping rings removed so as to exhibit the facet units in full.
Figure 8:
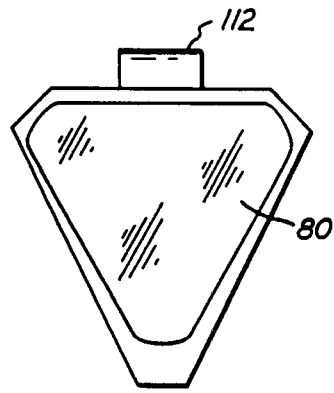
FIG. 8 is a elevational view of one of the facet units used in the assembly shown in FIGS. 6 and 7.

Referring to FIG. 5 there is shown a hologon scanner system having a deflector assembly 40. In this assembly is a holder having a cylindrical side wall 42 and a support or base 44. The periphery of the base 44 is stepped. The side wall 42 is assembled with the base 44 in the step. The side wall has exit windows 46 and 48, 180° opposite to each other and opposed to planar diffraction grating units 50 and 52. These windows may be covered with glass discs 53. This reduces whistling. These gratings are separate facets. The grating diffraction surfaces are disposed at predetermined acute angles with respect to the axis of rotation 54 of the assembly 40. Another pair of gratings opposed to respective openings in the side wall 42 of the holder may be used inclined at like angles to the axis of rotation 54. Then the gratings define a pyramidal hologon scanner with four gratings spaced 90° apart. The upper end of the cylindrical side wall 42 has a step in which a glass or other transmissive disc 72 is mounted and held down as by a clamping ring 74. The ring 74 may be screwed into the upper end of the wall 42 or assembled with a force fit.

The diffraction surfaces of the gratings are formed in one substrate, which is protected by a plate. Each grating is fabricated individually and then placed in the holder. The lower edges of each grating are pivotally mounted in notches 56 and 58 in the base 44. The lower ends are held down by a spring clamping mechanism 60 including a conical washer 62 which bears against the top surfaces of the grating units 50 and 52 at the lower end thereof. The upper ends are sandwiched between springs 64 and 66 and adjusting screws 68 and 70. By extending or retracting the screws 68 and 70, the tilt angles of the gratings can be adjusted with respect to the axis of rotation and the collimated incident laser beam which is parallel to the axis of rotation 54. This adjustment adjusts the predetermined angle of the grating surfaces with respect to the axis 54 and the incident beam so as to obtain the 90° deflection between the incident and diffracted beams. The requisite tilt angle of the grating when the reflected light is to be blocked, as shown in FIG. 2A, may also be obtained by means of this adjustment.

The grating tilt adjustment mechanism can be used to compensate for facet to facet (grating to grating) cross-scan error caused by small differences in facet periodicity (D values). The tilt adjustment can also be used to compensate for substrate wedge and/or fixed angular displacements of the axis 54 of the assembly 40 with respect to the axis of a shaft 80 of a motor 82 which rotates the assembly 40 about the axis 54. A mounting or base plate for the motor is not shown to simplify the illustration.

A focusing lens 84 similar to the lens 22 (FIG. 1) may be used to focus the scan beam (the diffracted beam) to an image plane on a receptor surface 24. As in FIG. 1, a folding mirror 26 may be used.

The gratings are fabricated to provide equal angles of incidence and diffraction, $(\theta_i = \theta_d)$ which in the illustrated case are 45° to the normal to the diffracting surface of the gratings. One of the gratings comes into play at a time as the assembly 40 rotates. With two gratings the duty cycle is approximately twice that of the system shown in FIG. 1. With four gratings the duty cycle is approximately four times that of the system shown in FIG. 1.

It is preferably that the planar gratings 50 and 52 be fabricated without optical power since wobble may introduce beam displacement errors (cross-scan errors). These errors may be eliminated if a diverging wavefront from a point source on the axis of rotation 54 spaced a distance from the grating surface equal to the distance from the grating surface to the image plane, is used.

The holder may be square in cross-section rather than circular. A cylindrical holder of circular cross-section is preferred in order to reduce windage losses.

While it is preferable to provide these scanners in a preobjective configuration as shown in FIGS. 1-5, they may be used in a postobjective deflector mode; that is having the focusing lens in the incident beam path before the scanner assembly. The postobjective mode is not preferable in that the plane grating facets introduce both coma and astigmatism into the scanning focus beam. These aberrations can be compensated for completely in one point in the scan field and partially at other points in the field by introducing the opposite amount of these aberrations into the incident beam. This can be accomplished by tilting the postobjective focusing lens, if it is corrected for only axial rays, or by placing a dispersive element, such as a prism or grating between the focusing lens and the deflector assembly. If a grating is used in the postobjective mode it should have the same grating period as the hologon deflectors. Then, the compensating grating element can be used to compensate for dispersion induced cross-scan error caused by wavelength spread in the input laser source. A postobjective scanner arrangement is more sensitive to cross-scan error caused by deflector wobble and offset errors as compared with the preobjective scanner geometry as shown is FIGS. 1-5.

The major advantage of the postobjective scanner geometry is that the focusing lens may be of less quality (be less expensive) than the preobjective deflector focusing lens, because it only has to function on axis. The preobjective scanner geometry shown in FIG. 2 has the advantage of the postobjective scanner in that a less expensive single lens is used always on axis. The FIG. 2 geometry does not suffer from coma or astigmatism since the grating facet is used in collimated light.

Referring to FIGS. 6-9, there is shown a hologon scanner assembly 79 similar to the assembly shown in FIG. 5. There are five hologon deflection gratings or facets 80. Each is generally triangular in shape. They fit together within a cylindrical holder 82 having a cylindrical side wall 84 which is stepped at its upper and lower ends. The holder 82 has a disc-shaped base 86 with a circular flange 88 which fits into the bottom step of the cylindrical side wall and may be assembled to the cylindrical side wall either by a force fit, cement or with screws. The base plate on which the motor is mounted is not shown to simplify the illustration.

The side wall 84 has an opening 96 in which a lens may be placed or a separate preobjective focusing lens may be used. The lens focuses the diffracted beam 98 at the image plane. A collimated incident beam 101 enters through the top of the holder 82.

The gratings 80 provide equal diffraction and incidence angles as in the gratings of the scanner systems illustrated in FIGS. 1, 2 and 5. The gratings themselves may have a substrate 102 contained in a frame 104 with a window. The gratings are holographically formed on the inside surface 106 of the substrate 102. The grating surface is thereby protected as in FIG. 5. The frames 104 are mounted, at the ends thereof, in a conical indentation 100 in the base 86 of the holder. A spring clamping mechanism 109 having a conical washer 108 bears against the upper surface of the grating elements near the lower ends thereof. These washers are opposed by adjusting screws 110 which extend through the base 86.

Cylindrical members 112 at the upper end of each frame 104 are supported on steps 114 near the upper end of the cylindrical side walls 84. The cylindrical members 112 pivotally mount the gratings for tilt adjust. The adjustments are effected by the screws 110. The angle of the grating surfaces 106 can then be individually adjusted, as described in connection with the gratings 50 and 52 (FIG. 5).

A clamping ring 116 having a conical bottom surface 118 holds the gratings 80 in place while allowing pivotal movement thereof for adjustment purposes. The ring 116 may be screwed into the upper end of the holder. A protective plate 119, and retaining ring 120 may be assembled over the clamp ring 116.

With five grating facets, the duty cycle of the scanner is approximately five times that of the scanners illustrated in FIG. 1. The operation of the scanning system shown in FIGS. 6–9 is similar to that of the system described in connection with FIG. 5.

Figure 11:
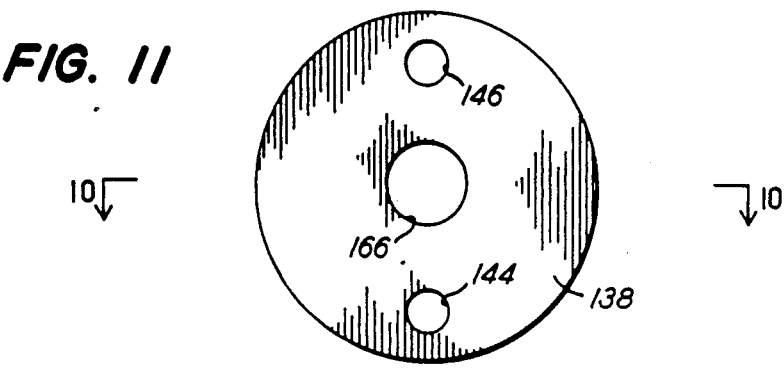
FIG. 11 is a plan view of the scanner system shown in FIG. 10.
Figure 10:
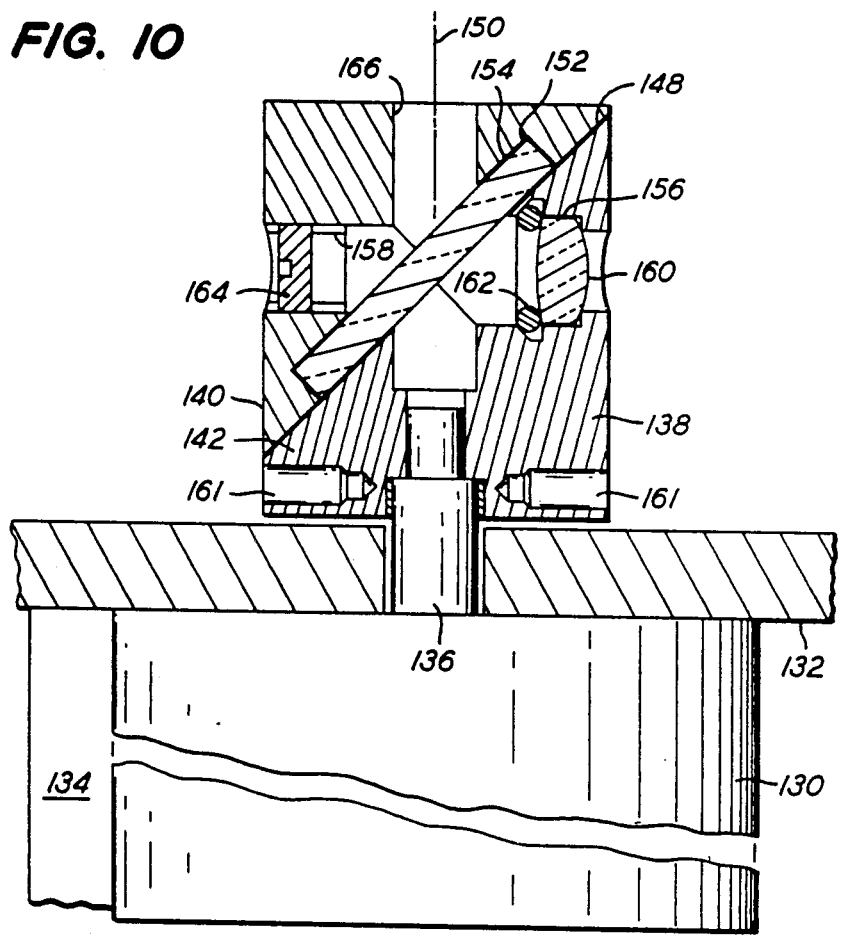
FIG. 10 is a diagrammatic, elevational view in section, the section being taken along the line 10—10 in FIG. 11, of a preobjective hologon scanning system in accordance with another embodiment of the invention, somewhat similar to the embodiment shown diagrammatically in FIG. 2.

Referring to FIGS. 10 and 11 there is shown a hologon scanner assembly which operates in a manner similar to the scanner assembly shown in FIG. 2. A motor 130 is mounted on a mounting plate 132. The mounting plate may be referenced and attached to a base plate 134. The shaft 136 of the motor 130 is connected to and collinear with the axis of a cylindrical holder 138 having two parts 140 and 142. Aligning holes 144 and 146 containing aligning pins or screws serve to align and hold the holder parts 140 and 142 together. The interface between the parts 140 and 142 is along a plane 148 at approximately 45° to the axis of rotation 150 of the holder. The upper part 140 has a slot 152 which receives the hologon diffraction grating element 154. This element is held in place so that its center is coincident with the axis of rotation 150 when the parts 140 and 142 of the holder 138 are assembled together. Holes 156 and 158, 180° apart are provided. The hole 156 is stepped so as to provide a mounting for a focusing lens 160. This lens is held in place by a lens retaining ring 162. The other hole 158 receives a balancing screw 164. To achieve a higher degree of balancing in all planes, additional balancing screws can be used in holes 161, which may be threaded. Collimated incident light from a laser can enter the hole 166 which is collinear with the axis 150. This light is diffracted in the grating 154 and the diffracted beam leaves through the exit hole 156. It is focused by the lens 160 on the image surface.

The scanner shown in FIGS. 10 and 11 may be fabricated with a minimum number of parts at low cost and provides an essentially bow-free scan line which is also essentially free of cross-scan errors as was the case with the scanners described in connection with FIGS. 1–9 above.

Figure 9:
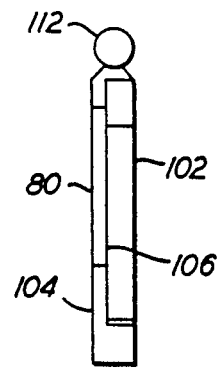
FIG. 9 is an end view of the facet unit shown in FIG. 8.
Figure 13:
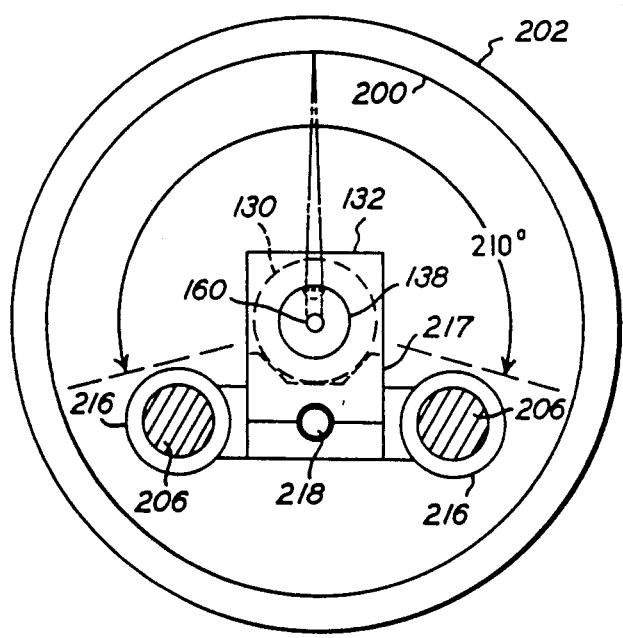
FIG. 13 is a sectional view taken along the line 13—13 in FIG. 12.
Figure 12:
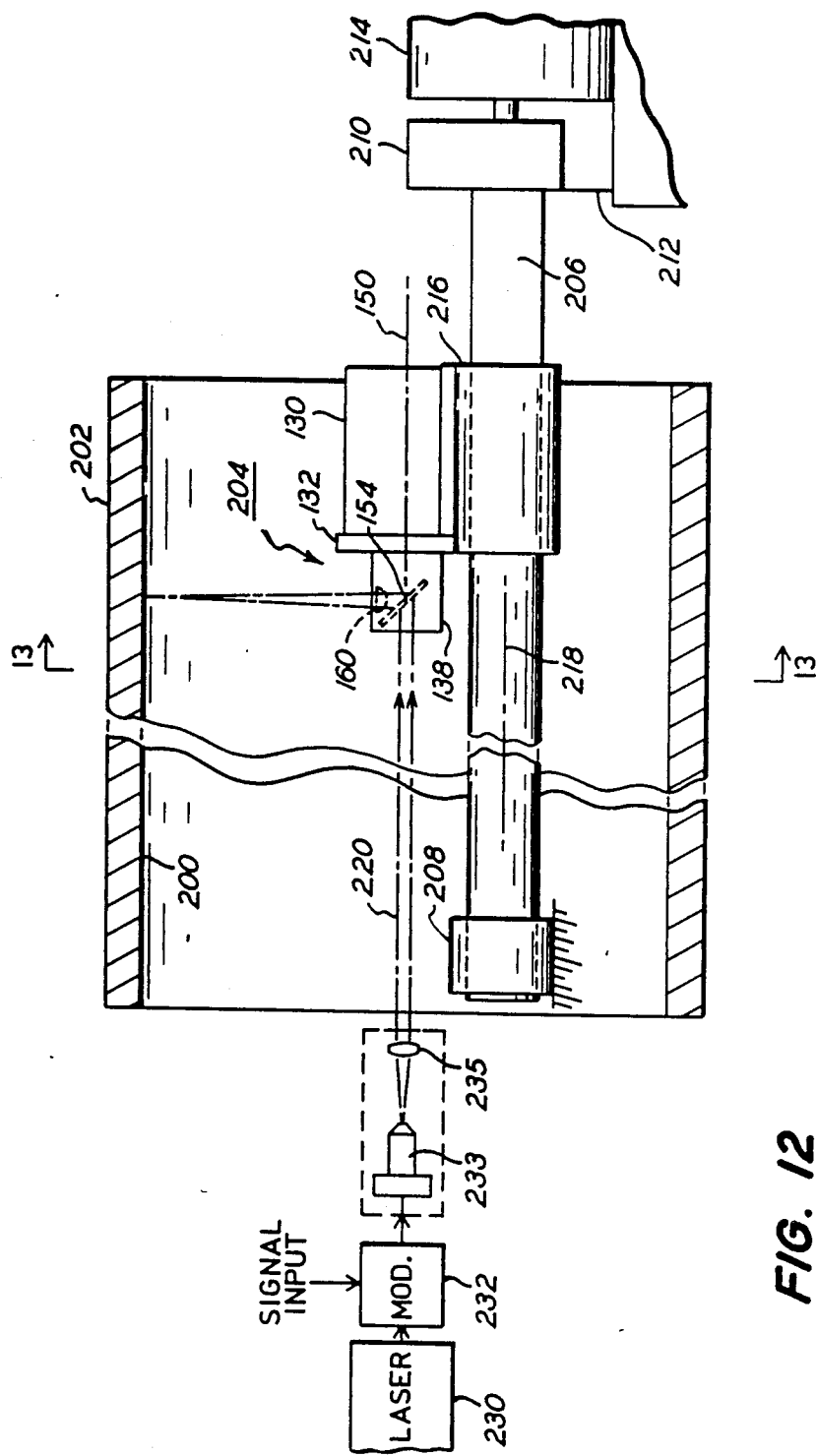
FIG. 12 is a diagrammatic view of a hologon scanner system embodying the invention wherein the scan beam is arranged to scan collinear lines on a cylindrical surface which defines the image plane on the inner periphery of a drum.

Referring to FIGS. 12 and 13 there is illustrated a printing system for graphic reproduction on an image surface 200 mounted on the cylindrical inner periphery of a drum 202. The inner periphery of the drum may mount a receptor surface such as a printing plate. A scanner subassembly 204 similar to that shown in FIGS. 9 and 10 is mounted within the drum and is movable along a slide 206 having an axis parallel to the axis of the drum. The slide is supported at opposite ends thereof and supports 208 and 210. The support 210 rests on a base 212 which also supports a slide motor 214. The motor may drive a translating mechanism, such as a screw which moves a slide assembly 216 along the mechanical axis 218 of the slide (this axis being parallel to the axis of the drum.)

The parts of the scanner assembly which are similar to the parts shown in FIGS. 10 and 11 are identified by like reference numerals. The diffraction grating element 154 is mounted so that its center is coincident with the collimated laser beam 220, the beam is focused at the image plane 200 by the lens 160. Successive collinear lines are scanned 360° around the cylindrical image plane during each 360° of rotation of the holder 138 and grating facet 154.

The laser beam is generated by laser 230. The image is formed by modulating the intensity of the beam from the laser in an electro-optic modulator 232 in response to an electrical signal input. The beam is expanded by beam expanding telescope optics 233 and collimated by lens 235.

The system illustrated in FIGS. 12 and 13 provides essentially bow-free and cross-error free collinear scan lines for high resolution production of images on cylindrical surfaces; the system being especially suitable for fabricating printing plates.

In order to provide uniform diffraction efficiency over the scan line and uniform intensity along the entire scan line (because diffraction efficiency for sinusoidal surface relief gratings formed in photoresist depends upon the polarization state of the light) it is desirable to use unpolarized (randomly) or circularly polarized incident light from the laser 230. It is desirable and preferable over using a randomly polarized laser to provide in the laser the optics (waveplates and other conventional means) for providing a circularly polarized beam. Also the use of a circularly polarized laser beam ensures against laser instability due to specular reflective feedback, since circularly polarized light changes polarization state when back reflected. This is a feature of the system shown in FIGS. 12 and 13 because a specularly reflected beam from the image surface 200 then propagates back along the incident scan beam and is trapped by the optics and thereby not able to accidentally expose other areas of the image surface, when the grating does not linearly polarize the light. In the latter event, the deflected beam can be tilted as mentioned in the discussion of the cylindrical, drum image surface above and in FIG. 2A, so that the deflected beam is not perpendicular to the image surface. Then, the specularly reflected light does not propagate back along the direction of the scan beam and does not enter the optical system and is not fed back the laser.

Figure 15:
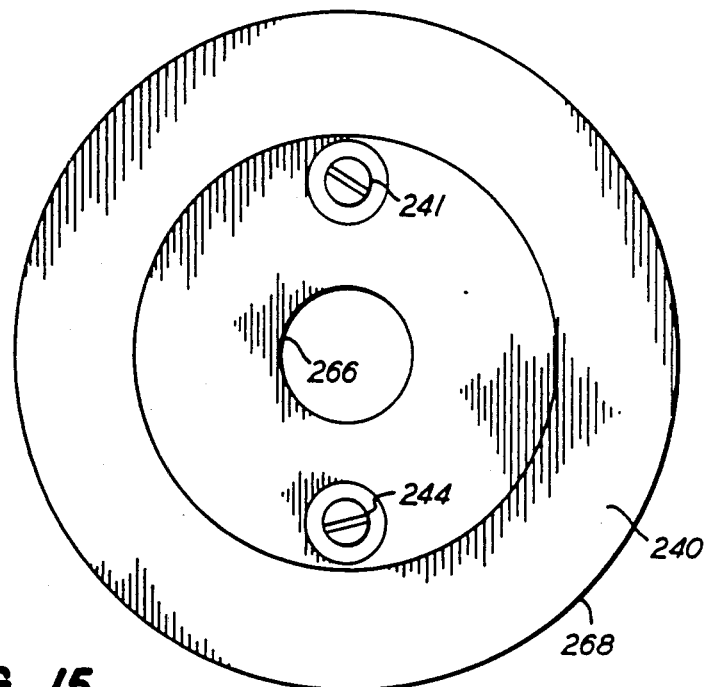
FIGS. 14 and 15 are views similar to FIGS. 10 and 11 showing still another embodiment of the invention.
Figure 14:
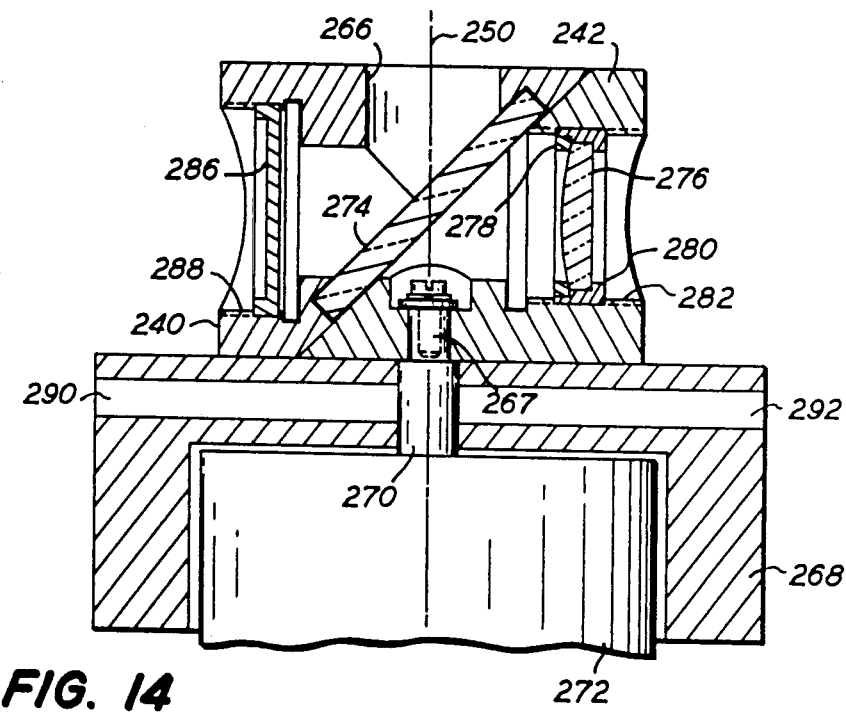

Referring to FIGS. 14 and 15 there is shown a hologon scanner assembly similar to that shown in FIGS. 10 and 11. There are two holder subassemblies 240 and 242 split along a plane 45° to the rotation axis 250. Bolts 244 and 246 interconnect the assemblies 240 and 242. A bolt and washer assembly 267 connects the interconnected holder subassemblies 240 and 242 and a cylindrically cup-shaped balancing base 268 to the shaft 270 of a motor 272. The base 268 adds mass below the plane where the motor shaft exits the motor and moves the center of gravity of the rotating assembly above to the bearing plane of the motor. The diffraction grating 274 is sandwiched between the subassemblies, as in FIGS. 10 and 11. There is also a focusing lens 276 held by a retainer ring 278 in a barrel 280 which may be screwed into the bore opening 282 to adjust for variations in focal length of different lenses. The incident beam enters from the top through the hole 266, collinearly with the axis 250. The diffracted beam, perpendicular to the axis, leaves through the bore 282 and the lens 276.

A counter weight 286 is located in a bore 288 diametrically opposite to and collinear with the beam outlet bore. Balancing screw holes 290 and 292 are diametrically opposed and perpendicular to the shaft axis for ease of two plane balancing.

From the foregoing description it will be apparent that there has been provided improved hologon scanner systems. Variations and modifications of the herein described systems, within the scope of the invention, will undoubtedly suggest themselves to those skilled in the art. Accordingly, the foregoing description should be taken as illustrative and not in a limiting sense.

I claim:

1. A hologon scanner system which comprises a planar light transmissive member having a difference grating formed thereon, means providing a beam of light incident upon an area of said member with an angle of incidence $\theta_i$, which is essentially equal to the diffraction angle $\theta_d$, at every point across the entire area, means for rotating said member about an axis with said grating inclined at a predetermined angle to said axis so that a beam of light propagating with a principal direction component in the direction of said axis is diffracted by said grating to produce a diffracted beam transverse to said axis which scans an essentially bow free line across an image surface over a scan angle $\theta_S = \theta_R$, where $\theta_R$ is the angle of rotation of said grating, said predetermined angle being such that the angle of incidence of said beam to said grating $\theta_i$ and the diffraction angle $\theta_d$ of said diffracted beam exciting said grating are essentially equal and remain constant over all angles of rotation $\theta_R$; and $$\sin\theta = \lambda/2D$$

where $\theta$ is approximately equal to $\theta_i$ which is essentially equal to $\theta_d$ for all values of $\theta_R$, and where $\lambda$ is the wavelength of light and D is the grating period.

2. The system according to claim 1 wherein said grating is a holographic grating.

3. The system according to claim 1 further comprising means for deflecting said beam propagating along said axis with respect to said grating to provide an angle other than said angle of incidence and said diffraction angle the sum of said diffracting angle and said predetermined angle defining the angle between said diffracted beam and said axis.

4. The system according to claim 3 wherein said deflecting means a prism.

5. The system according to claim 3 wherein said deflecting means is a grating.

6. The system according to claim 1 wherein said planar member is disposed so that said axis of rotation passes therethrough.

7. The system according to claim 6 wherein said planar member is rectilinear in shape and said axis passes through the middle thereof.

8. The system according to claim 1 wherein $\lambda/D = 1.4142$.

9. The system according to claim 1 wherein said rotating means comprises a holder having an axis centrally thereof, a motor for rotating said holder, the axis of said holder being said rotation axis, and said member being mounted in said holder and rotatable therewith.

10. The system according to claim 9 wherein a plurality of said members each having a planar diffraction grating are mounted in said holder spaced radially from said axis and offset from each other circumferentially about said axis.

11. The system according to claim 10 wherein said plurality of members comprise at least one pair of said members which are disposed 180° from each other, the predetermined angles between said gratings and said axis being essentially equal and opposite to each other.

12. The system according to claim 10 wherein said beam intercepts each of said gratings as it rotates around said axis through said beam.

13. The system according to claim 12 wherein said grating members are symmetrically disposed about said axis.

14. The system according to claim 12 wherein said rotating means comprises a holder having an entrance for said beam at one end thereof and exit windows for the diffracted beam perpendicular to said axis in the wall of said holder and opposite to said grating members, said holder having a base, one end of each of said members being mounted on said base, disposed tilted with respect to said axis, and a motor for rotating said holder about said axis.

15. The system according to claim 1 wherein said member is mounted displaced radially from said axis.

16. The system according to claim 1 further comprising means for adjusting the tilt of said grating member with respect to said axis thereby adjusting said predetermined angle to compensate for cross scan errors due to variation in grating period, wedge errors in said member, and inclination of said axis with respect to the coordinate system associated with said grating.

17. The system according to claim 1 wherein said rotating means comprises a holder for said grating having a support surface and a side surface, means for pivotally mounting one end of said grating member on one of said surfaces, and means for movably supporting the opposite end of said grating on the other of said surfaces as so as to pivot said member and adjust the tilt thereof thereby adjusting said predetermined angle.

18. The system according to claim 17 wherein a plurality of said grating members are supported by said holder each displaced radially and from said axis and circumferentially from each other about said axis, separate ones of said pivotally and movably supporting means for each of said grating members.

19. The system according to claim 1 further comprising a preobjective focusing lens between said grating member and said image plane for focusing said diffracted beam, to a spot which scans across said line.

20. The system according to claim 19 further comprising a holder for said grating having an opening along said axis for entrance of said beam of light propagating in the direction of said axis, and an opening for exit of said diffracted beam perpendicular to said axis, said focusing lens being mounted in said exit opening and rotates with said grating.

21. The system according to claim 1 further comprising means providing a cylindrical surface around said axis of rotation which provides said image surface on which said line is scanned over a scan angle $\theta_s$ equal to the angle of rotation $\theta_R$ of said grating about said axis.

22. The system according to claim 21 further comprising a pre-objective focusing lens of sufficient focal length to focus said diffracted beam at said image plane.

23. The system according to claim 21 wherein a drum provides said cylindrical surface having an axis collinear with said rotating axis, an assembly including said grating member rotating in said drum, and means for translating said assembly along said axis to scan successive lines across said cylindrical surface.

24. The system according to claim 21 further comprising laser means providing said beam with a polarization selected from the group consisting of circular polarization and random polarization.

25. The apparatus according to claim 1 wherein said grating forms a holographic optical lens which focuses said diffracted beam into a spot which scans said line.

26. The system according to claim 1 wherein $\theta_i = \theta_d$ and the grating is tilted with respect to a perpendicular to said axis sufficiently such that the light reflected from said grating along the path of said beam of light which is diffracted by said grating.

27. The system according to claim 26 wherein said image surface is cylindrical and collinear with said axis.

28. The system according to claim 26 wherein said grating is tilted from said axis by a tilt angle, $\theta_T$, such that said diffracted beam differs in direction from a direction 90° to said axis by said tilt angle $\theta_T$, $\theta_i$ and $\theta_d$ and any angle which the incident beam upon said grating makes with said axis add to 90°, and further including postobjective lens in the path of said beam of light having its principal axis tilted from perpendicularity to said axis by $\theta_T$.

29. Hologon scanner apparatus which comprises a planar substrate having a diffraction grating formed therein, means for rotating said grating about an axis, and means for adjustably disposing said grating at a predetermined acute angle with respect to said axis.

30. The apparatus according to claim 29 wherein said grating is a holographic diffraction grating.

31. The apparatus according to claim 29 means providing a source of collimated coherent light which provides a beam in a direction along said axis which is incident upon said grating.

32. The apparatus according to claim 29 wherein said rotating means comprises a holder for said grating having a support surface and a side surface, means for pivotally mounting one end of said grating member on said one of said surfaces, and means for movably supporting the opposite end of said grating and on the other of said surfaces so as to pivot said member and adjust the tilt and said predetermined angle thereof.

33. The apparatus according to claim 29 wherein a plurality of said grating members are supported by said holder each displaced radially and from said axis and circumferentially from each other about said axis, and a separate one of said pivotally and movably supporting means being provided for each of said grating members.

34. The apparatus according to claim 29 wherein said rotating means comprises a holder, a first opening for light incident upon said grating and collinear with said axis, a second opening in said housing for light diffracted by said grating perpendicular to said axis, and a focusing lens in said second opening.

35. The apparatus according to claim 29 wherein said rotating means comprises a holder, a planar member having said grating on an inside surface thereof, a protective member defining a window disposed on said planar member over the inside surface thereof.

36. The apparatus according to claim 29 wherein said rotating means comprises a holder for said grating, a motor for rotating said holder, said motor having a shaft connected to said holder, a balancing mass connected to said shaft between said holder and said motor, said mass being cup-shaped and having a base connected to said shaft and sides extending away from said holder around said motor.

37. The apparatus according to claim 35 wherein said base has diametrically opposed openings perpendicular to said shaft for receiving balancing weights.

* * * * *